United States Patent
Wei et al.

(10) Patent No.: US 11,615,766 B2
(45) Date of Patent: Mar. 28, 2023

(54) CONTROL METHOD FOR MAGNIFYING DISPLAY SCREEN AND ASSOCIATED DISPLAY SYSTEM

(71) Applicant: Realtek Semiconductor Corp., HsinChu (TW)

(72) Inventors: Jui-Te Wei, HsinChu (TW); Yung-Chih Chen, HsinChu (TW); Po-An Chen, HsinChu (TW); Wei-Chih Lin, HsinChu (TW); Yuh-Wey Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/474,073

(22) Filed: Sep. 14, 2021

(65) Prior Publication Data

US 2022/0358899 A1    Nov. 10, 2022

(30) Foreign Application Priority Data

May 4, 2021 (TW) .................................. 110116000

(51) Int. Cl.
*G09G 5/377* (2006.01)
*G09G 5/373* (2006.01)

(52) U.S. Cl.
CPC ............. *G09G 5/373* (2013.01); *G09G 5/377* (2013.01); *G09G 2320/0606* (2013.01); *G09G 2340/045* (2013.01); *G09G 2340/10* (2013.01); *G09G 2340/12* (2013.01); *G09G 2354/00* (2013.01); *G09G 2360/12* (2013.01)

(58) Field of Classification Search
CPC ................. G09G 5/373; G09G 5/377; G09G 2320/0606; G09G 2340/045; G09G 2340/10; G09G 2340/12; G09G 2354/00; G09G 2360/12
See application file for complete search history.

(56) References Cited

U.S. PATENT DOCUMENTS

| | | | |
|---|---|---|---|
| 5,227,771 A * | 7/1993 | Kerr ....................... | G06F 3/0481 345/157 |
| 10,275,436 B2 | 4/2019 | Everitt et al. | |
| 10,474,351 B2 | 11/2019 | Fleizach et al. | |
| 10,725,621 B2 | 7/2020 | Chen | |
| 2007/0030245 A1 | 2/2007 | Ngari et al. | |
| 2008/0209048 A1* | 8/2008 | Sampath ................. | H04L 67/14 709/227 |
| 2011/0173564 A1 | 7/2011 | Margarint et al. | |

FOREIGN PATENT DOCUMENTS

TW        201724029 A    7/2017

* cited by examiner

*Primary Examiner* — Antonio A Caschera
(74) *Attorney, Agent, or Firm* — Winston Hsu (57) ABSTRACT

A display system includes a display device. The display device is arranged to receive a video signal and a control signal from a host system, and includes a processing circuit and a display screen, wherein the processing circuit is arranged to process an original frame corresponding to the video signal according to the control signal, to generate a magnified frame, and generate a processed frame according to the magnified frame and the original frame, and the display screen is coupled to the processing circuit, and is arranged to display the processed frame.

4 Claims, 8 Drawing Sheets

CONTROL METHOD FOR MAGNIFYING DISPLAY SCREEN AND ASSOCIATED DISPLAY SYSTEM

BACKGROUND OF THE INVENTION

1. Field of the Invention

The present invention is related to display screen magnification technology, and more particularly, to a control method for magnifying a display screen and associated display system.

2. Description of the Prior Art

With the advancement of technology, operating system (OS), software, display devices, etc. may provide different display modes (e.g. picture split mode, picture-by-picture (PBP) mode, or picture-in-picture (PIP) mode) for various multi-tasking applications (e.g. multi-window, dual-frame, or multi-frame), thereby allowing users to watch different work frames or display signals. For example, Microsoft provides a magnifier function in Windows, and continuously enhances or adds different display modes to improve the convenience of users for reading and watching.

Generally speaking, regarding control of the display screen magnification, users usually only use host-side software (e.g. controlling the graphics processing unit (GPU) in the host-side to process the frame by the software) or display device's on-screen-display (OSD) menu interface. However, the former (i.e. software display screen magnification function) is limited by software environment of the video signal source, and many entertainment devices (e.g. television (TV) game consoles) may not support this function. The latter (i.e. OSD function) will directly control the OSD menu interface through physical buttons on the display device to adjust parameters to achieve a specific visual effect, but its disadvantage is that it may only magnify a few specific positions (e.g. middle of the frame, four corners of the frame, or a pre-defined position). Different magnified positions may not be selected according to different frames, so the settings that can be changed have limited flexibility. In addition, since the limited design of the display screen control, it cannot use a keyboard to set a hotkey for quick switching (e.g. turning on/off the magnification function). Since users cannot perform other operations while the frame is being magnified, the OSD menu interfaces cannot be universally applied to the display devices. In order to provide users with operational convenience, an innovative control method for magnifying the display screen and associated display system are urgently needed.

SUMMARY OF THE INVENTION

It is therefore one of the objectives of the present invention to provide a control method for magnifying a display screen and associated display system, to address the above-mentioned issues.

At least one embodiment of the present invention provides a display system. The display system includes a host system and a display device. The host system is arranged to generate a video signal and a control signal. The display device is arranged to receive the video signal and the control signal from the host system, and includes a processing circuit and a display screen, wherein the processing circuit is arranged to process an original frame corresponding to the video signal according to the control signal, to generate a magnified frame, and generate a processed frame according to the magnified frame and the original frame. The display screen is coupled to the processing circuit, and is arranged to display the processed frame.

At least one embodiment of the present invention provides a control method for magnifying a display screen. The control method includes: receiving a video signal and a control signal from a host system; processing an original frame corresponding to the video signal according to the control signal, to generate a magnified signal; generating a processed frame according to the magnified frame and the original frame; and displaying the processed frame.

The control method for magnifying the display screen that is provided by the present invention may first determine size and/or position of a frame to be magnified through a coordinate (e.g. a coordinate that may be generated by a cursor controlled by a mouse) at the host, and operate (e.g. turn on/off the magnification function) through a control instruction (e.g. a control instruction that may be generated by a hotkey configured by a keyboard). In this way, the display screen may be magnified at the designated position, which not only has the convenience of simple operation, but greatly improves the user experience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
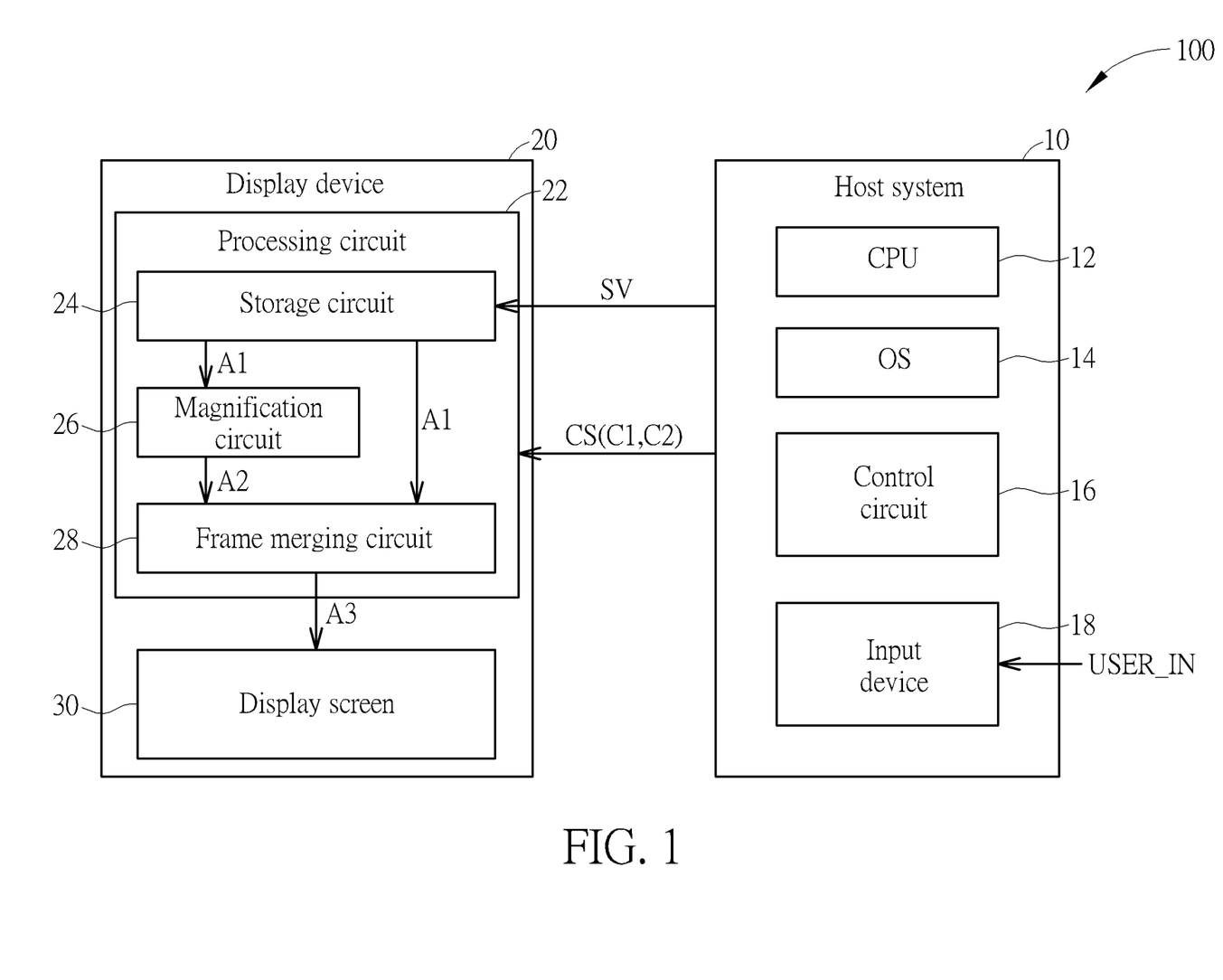
FIG. 1 is a diagram illustrating a display system according to an embodiment of the present invention.

FIG. 1 is a diagram illustrating a display system 100 according to an embodiment of the present invention. As shown in FIG. 1, the display system 100 may include a host system 10 (e.g. a computer host) and a display device 20. The host system 10 may be arranged to generate a video signal SV and a control signal CS, and may include a central processing unit (CPU) 12, an operating system (OS) 14, a control circuit 16, and an input device 18. In this embodiment, the control circuit 16 may be realized by executing a display screen magnification control software (not shown) through the CPU 12. The display screen magnification control software and the OS 14 are installed in the host system 10 in the form of software, and can be executed by the CPU 12.

The input device 18 is used as a user interface, and can receive a user input signal USER_IN. The user input signal USER_IN may include a magnification information signal and a magnification operation signal, wherein the magnification information signal has information about the size and/or position of the frame to be magnified, and may be generated by a cursor that is controlled by a mouse, and the magnification operation signal has a function for determining whether to magnify the frame, and may be generated by a hotkey that is configured by a keyboard, but the present invention is not limited thereto. After the input device 18 receives the user input signal USER_IN, the control circuit 16 may be arranged to generate a coordinate C1 and a control instruction C2 according to the user input signal USER_IN, wherein the coordinate C1 corresponds to the above-mentioned magnification information signal, the control instruction C2 corresponds to the above-mentioned magnification operation signal, and the control signal CS includes the coordinate C1 and the control instruction C2 (i.e. CS=C1+C2).

The display device 20 may be arranged to receive the video signal SV and the control signal CS from the host system 10, and may include a processing circuit 22 and a display screen 30, wherein the processing circuit 22 may include a storage circuit 24, a magnification circuit 26, and a frame merging circuit 28. The storage circuit 24 may be arranged to store an original frame A1 corresponding to the video signal SV. The magnification circuit 26 is coupled to the storage circuit 24, and may be arranged to retrieve a retrieved frame that is indicated by the coordinate C1 from the original frame A1 according to the control instruction C2, and magnify the retrieved frame to generate a magnified frame A2. By determining the size and/or position of the retrieved frame through the coordinate C1 and determining whether to generate the magnified frame A2 through the control instruction C2, the display system 100 not only has the convenience of simple operation, but greatly improves the user experience. In addition, in some embodiments of the present invention, the magnification circuit 26 may further add image effect(s) to the magnified frame A2, including, but not limited to, enhancing brightness, changing color effects, translucent superposition, and/or enhancing sharpness.

The frame merging circuit 28 is coupled to the storage circuit 24 and the magnification circuit 26, and may be arranged to merge the original frame A1 and the magnified frame A2, to generate a processed frame A3. For example, the processed frame A3 may be generated by superposing the magnified frame A2 on the original frame A1. In addition, in some embodiments of the present invention, the frame merging circuit 28 may add image effect(s) to the processed frame A3, including, but not limited to, enhancing brightness, changing color effects, translucent superposition, and/or enhancing sharpness. The display screen 30 is coupled to the processing circuit 22 (more particularly, the frame merging circuit 28 in the processing circuit 22), and may be arranged to display the processed frame A3.

Figure 2:
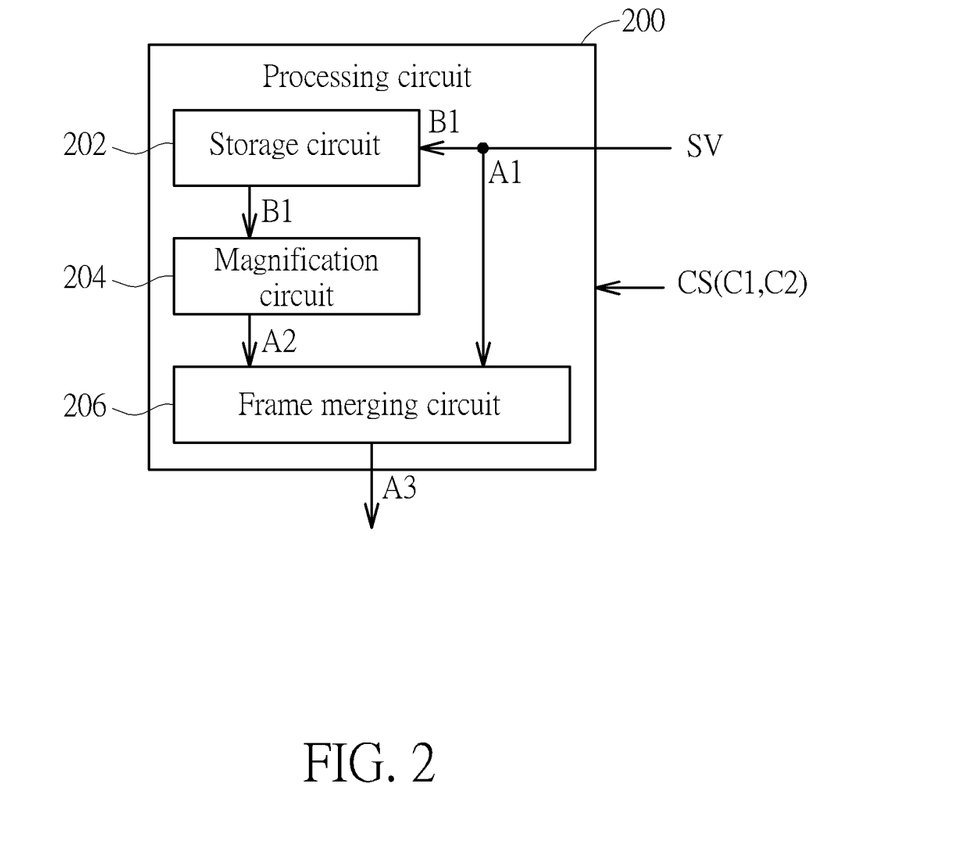
FIG. 2 is a diagram illustrating the processing circuit shown in FIG. 1 according to another embodiment of the present invention.

FIG. 2 is a diagram illustrating the processing circuit 22 shown in FIG. 1 according to another embodiment of the present invention. The processing circuit 22 shown in FIG. 1 may be realized by a processing circuit 200 shown in FIG. 2. As shown in FIG. 2, the processing circuit 200 includes a storage circuit 202, a magnification circuit 204, and a frame merging circuit 206. The storage circuit 202 may be arranged to store a retrieved frame B1 that is indicated by a coordinate C1 and retrieved from an original frame A1 corresponding to a video signal SV by the processing circuit 200 according to a control instruction C2. Compared with the processing circuit 22 shown in FIG. 1, since the storage circuit 202 stores the retrieved frame B1 instead of the original frame A1, storage space of the storage circuit 202 can be saved. The magnification circuit 204 is coupled to the storage circuit 202, and may be arranged to magnify the retrieved frame B1 to generate a magnified frame A2. The frame merging circuit 206 is coupled to the magnification circuit 204, and may be arranged to merge the original frame A1 and the magnified frame A2, to generate a processed frame A3.

Figure 3:
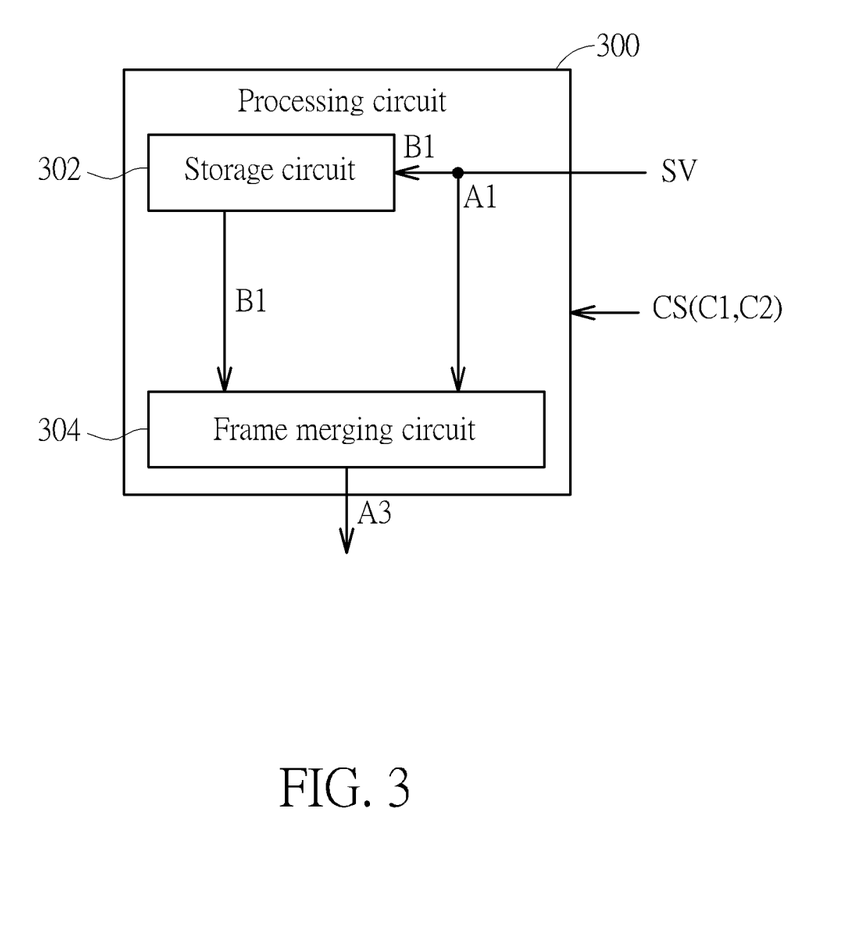
FIG. 3 is a diagram illustrating the processing circuit shown in FIG. 1 according to yet another embodiment of the present invention.

FIG. 3 is a diagram illustrating the processing circuit 22 shown in FIG. 1 according to yet another embodiment of the present invention. The processing circuit 22 shown in FIG. 1 may be realized by a processing circuit 300 shown in FIG. 3. As shown in FIG. 3, the processing circuit 300 may include a storage circuit 302 and a frame merging circuit 304, but does not include any above-mentioned magnification circuit. The storage circuit 302 may be arranged to store a retrieved circuit B1 that is indicated by a coordinate C1 and retrieved from an original frame A1 corresponding to a video signal SV by the processing circuit 300 according to a control instruction C2. Compared with the processing circuit 22 shown in FIG. 1, since the storage circuit 302 stores the retrieved frame B1 instead of the original frame A1, storage space of the storage circuit 302 can be saved. The frame merging circuit 304 is coupled to the storage circuit 302, and may be arranged to magnify the retrieved frame B1 to generate a magnified frame, and merge the original frame A1 and the magnified frame to generate a processed frame A3. As a result, in this embodiment, no additional magnification circuit (e.g. the magnification circuit 204 shown in FIG. 2) is needed to process and generate the magnified frame. Compared with the frame merging circuit 206, the frame merging circuit 304 in this embodiment has a built-in frame magnification function and a frame merging function, so it may have the functions of the magnification circuit 204 and the frame merging circuit 206 shown in FIG. 2 at the same time.

Figure 4:
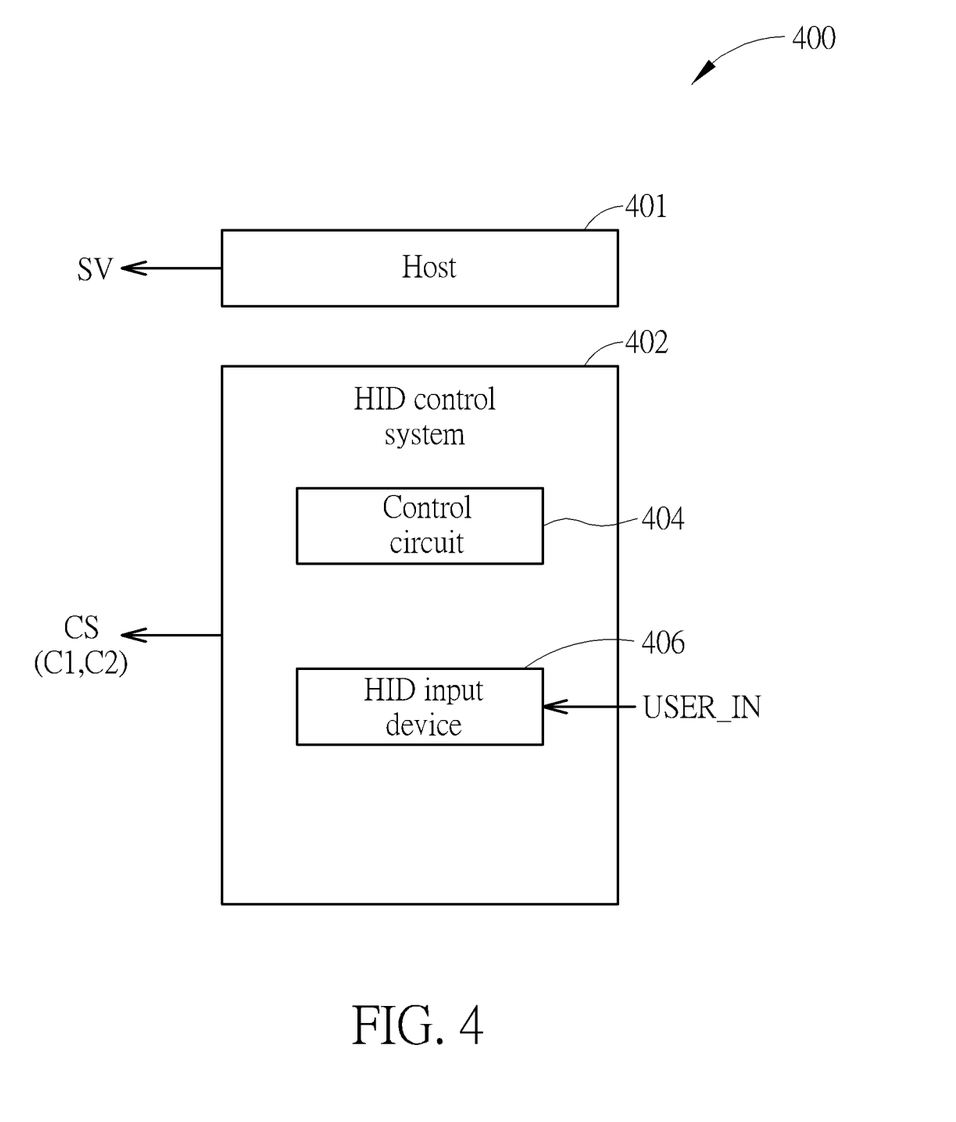
FIG. 4 is a diagram illustrating the host system shown in FIG. 1 according to another embodiment of the present invention.

FIG. 4 is a diagram illustrating the host system 10 shown in FIG. 1 according to another embodiment of the present invention. The host system 10 shown in FIG. 1 may be realized by a host system 400 shown in FIG. 4. The host system 400 includes a host 401 and a human interface device (HID) control system 402. In FIG. 4, the host 401 may be arranged to generate a video signal SV. For example, the host 401 can be any form of signal source, such as a game console. The HID control system 402 (e.g. a wired/wireless controller of a game console) may be arranged to generate a control signal CS, and may include a control circuit 404 and an HID input device 406, wherein the HID input device 406 may be arranged to receive a user input signal USER_IN. The user input signal USER_IN may include a magnification information signal and a magnification operation signal, wherein the magnification information signal has information about the size and/or position of the frame to be magnified, and may be generated by a cursor that is controlled by a mouse, and the magnification operation signal has a function for determining whether to magnify the frame, and may be generated by a hotkey that is configured by a keyboard, but the present invention is not limited thereto.

After the HID input device 406 receives the user input signal USER_IN, the control circuit 404 may be arranged to generate a coordinate C1 and a control instruction C2 according to the user input signal USER_IN, wherein the coordinate C1 corresponds to the above-mentioned magnification information signal, the control instruction C2 corresponds to the above-mentioned magnification operation signal, and the control signal CS includes the coordinate C1 and the control instruction C2 (i.e. CS=C1+C2). In this embodiment, the host 401 may not have an OS (e.g. the OS 14 shown in FIG. 1) or a specific software function (e.g. the display screen magnification control software that controls the control circuit 16 shown in FIG. 1). As a result, the host 401 is not limited by software environment of the video signal source, and many entertainment devices can be applied thereto (e.g. DVD players and TV game consoles).

Figure 5:
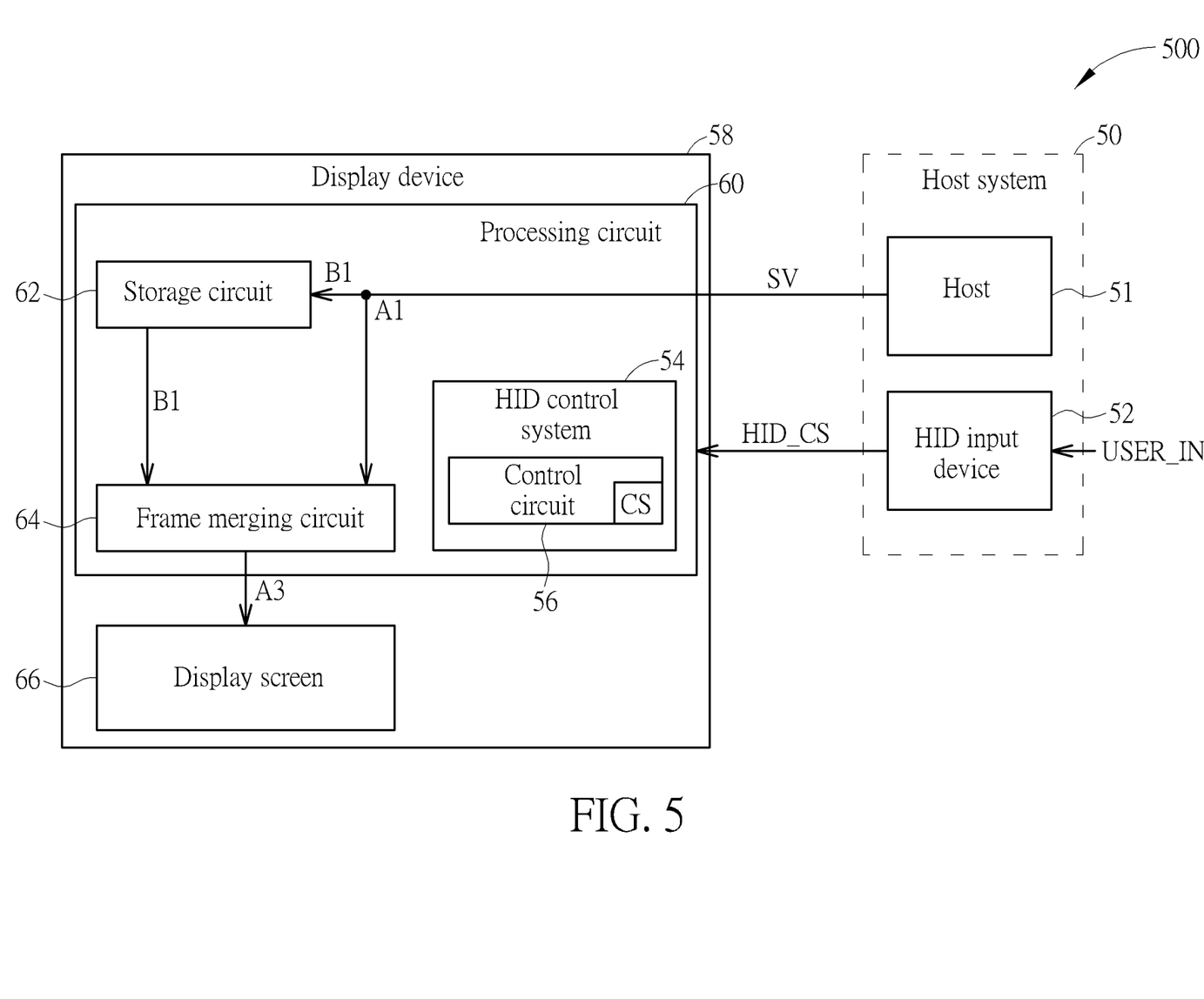
FIG. 5 is a diagram illustrating a display system according to another embodiment of the present invention.

FIG. 5 is a diagram illustrating a display system 500 according to another embodiment of the present invention. As shown in FIG. 5, the display system 500 may include a host system 50 and a display device 58, wherein the host system 50 includes a host 51 and an HID input device 52. The host 51 may be arranged to generate a video signal SV. The HID input device 52 may be arranged to receive a user input signal USER_IN and generate an HID control signal HID_CS according to the user input signal USER_IN. The user input signal USER_IN may include a magnification information signal and a magnification operation signal, wherein the magnification information signal has information about the size and/or position of the frame to be magnified, and may be generated by a cursor that is controlled by a mouse, and the magnification operation signal has a function for determining whether to magnify the frame, and may be generated by a hotkey that is configured by a keyboard, but the present invention is not limited thereto. It should be noted that, in this embodiment, the host 51 may not have an OS (e.g. the OS 14 shown in FIG. 1) or a specific software function (e.g. the display screen magnification control software that controls the control circuit 16 shown in FIG. 1). As a result, the host 51 is not limited by software environment of the video signal source, and many entertainment devices can be applied thereto (e.g. DVD players and TV game consoles).

The display device 58 may be arranged to receive the video signal SV from the host system 50 and receive the HID control signal HID_CS from the HID input device 52, and may include a processing circuit 60 and a display screen 66, wherein the processing circuit 60 may include a storage circuit 62, an HID control system 54, and a frame merging circuit 64. The HID control system 54 may include a control circuit 56, wherein after the control circuit 56 receives the HID control signal HID_CS, the control circuit 56 may generate a coordinate C1 and a control instruction C2 according to the HID control signal HID_CS. The coordinate C1 corresponds to the above-mentioned magnification information signal, and the control instruction C2 corresponds to the above-mentioned magnification operation signal. As a result, the control circuit 56 may be arranged to generate a control signal CS (which includes the coordinate C1 and the control instruction C2, that is, CS=C1+C2) according to the HID control signal HID_CS, for internal use of the processing circuit 60.

The storage circuit 62 may be arranged to store a retrieved frame B1 that is indicated by the coordinate C1 and retrieved from an original frame A1 corresponding to the video signal SV by the processing circuit 60 according to the control instruction C2. The frame merging circuit 64 is coupled to the storage circuit 62, and may be arranged to magnify the retrieved frame B1 to generate a magnified frame, and merge the original frame A1 and the magnified frame to generate a processed frame A3. As a result, in this embodiment, no additional magnification circuit (e.g. the magnification circuit 26 shown in FIG. 1) is needed to process and generate the magnified frame. The frame merging circuit 64 in this embodiment may have both of the function of the magnification circuit 204 and the function of the frame merging circuit 206 shown in FIG. 2 at the same time. The display screen 66 is coupled to the processing circuit 60 (more particularly, the frame merging circuit 64 in the processing circuit 60), and may be arranged to display the processed frame A3.

Figure 6:
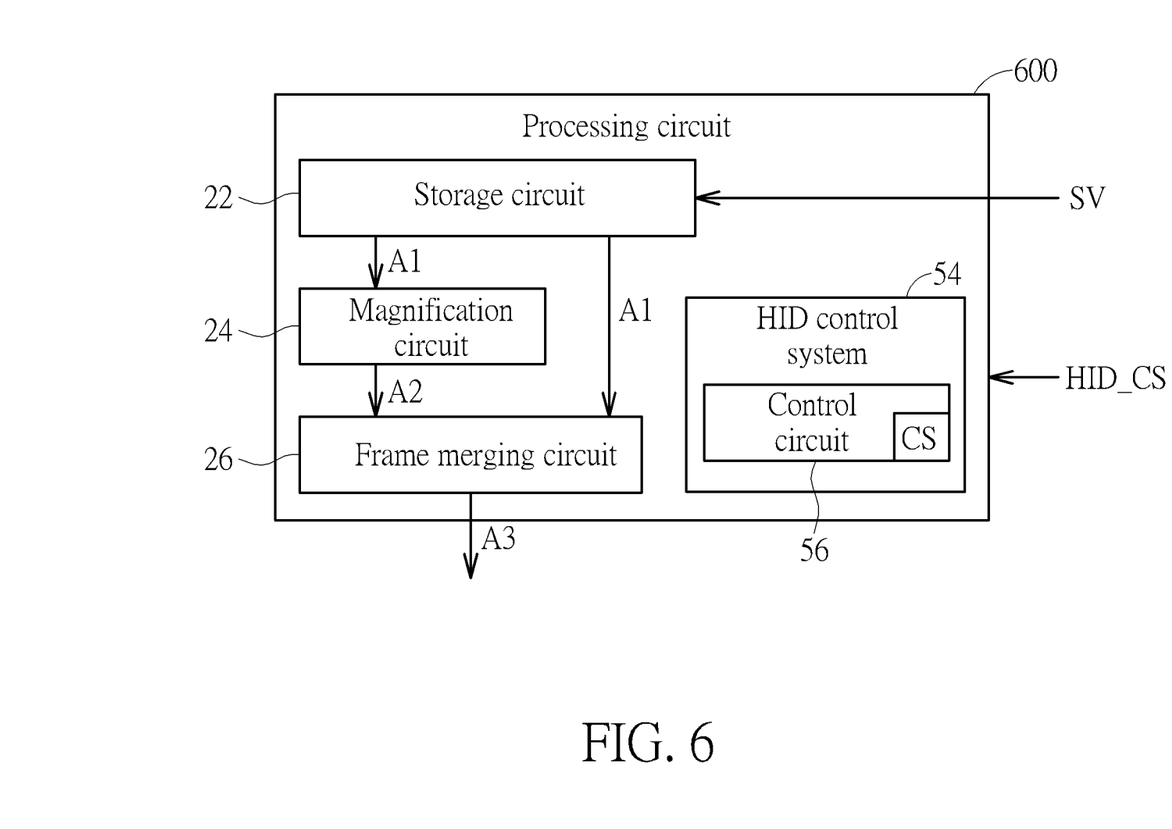
FIG. 6 is a diagram illustrating the processing circuit shown in FIG. 5 according to another embodiment of the present invention.
Figure 7:
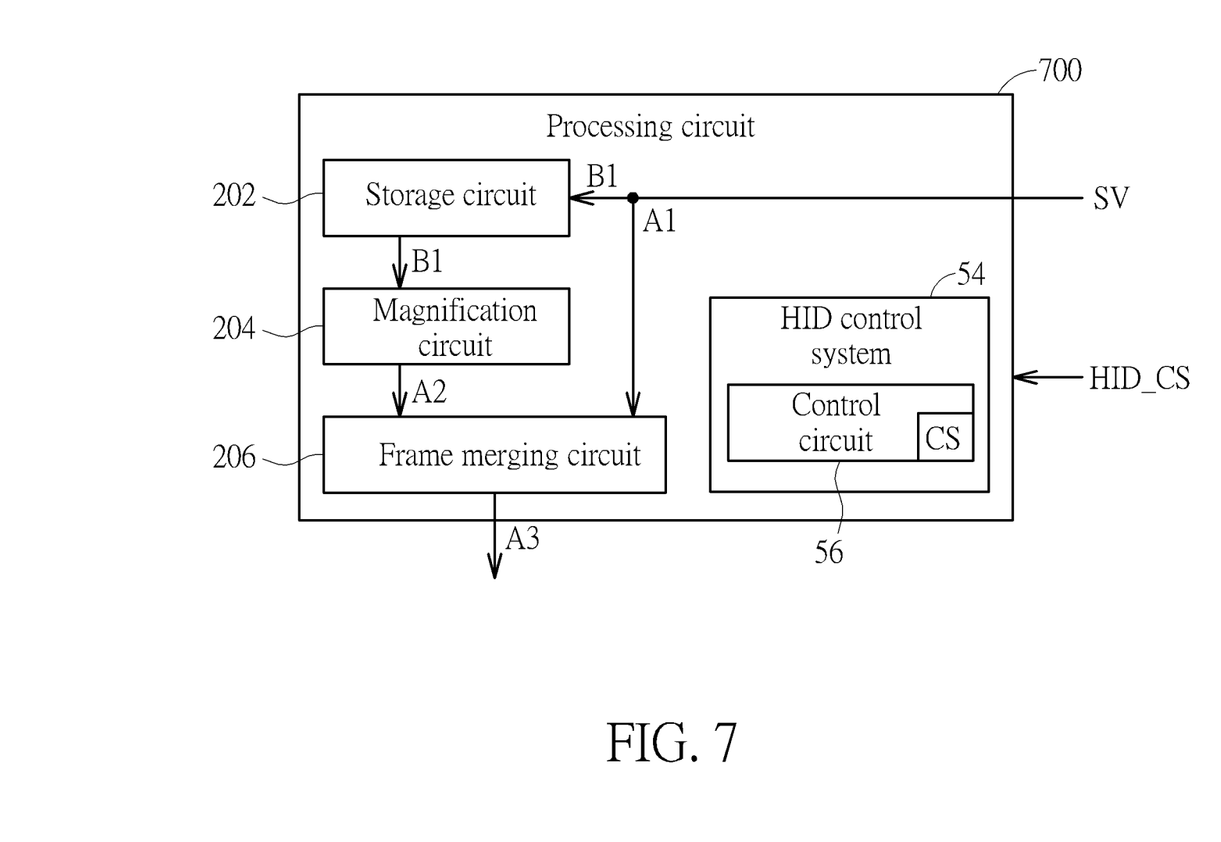
FIG. 7 is a diagram illustrating the processing circuit shown in FIG. 5 according to yet another embodiment of the present invention.

The processing circuit 60 shown in FIG. 5 can be regarded as the processing circuit 300 shown in FIG. 3 with the HID control system 54 additionally integrated therein. However, the same concept can also be applied to the processing circuit 22 shown in FIG. 1 and the processing circuit 200 shown in FIG. 2. FIG. 6 is a diagram illustrating the processing circuit 60 shown in FIG. 5 according to another embodiment of the present invention, and FIG. 7 is a diagram illustrating the processing circuit 60 shown in FIG. 5 according to yet another embodiment of the present invention. The processing circuit 60 shown in FIG. 5 may be realized by the processing circuit 600 shown in FIG. 6 (which may be regarded as the processing circuit 22 shown in FIG. 1 (more particularly, the storage circuit 24, the magnification circuit 26, and the frame merging circuit 28 shown in FIG. 1) with the HID control system 54 shown in FIG. 5 that is additionally integrated therein) or the processing circuit 700 shown in FIG. 7 (which may be regarded as the processing circuit 200 shown in FIG. 2 (more particularly, the storage circuit 202, the magnification circuit 204, and the frame merging circuit 206 shown in FIG. 2) with the HID control system 54 shown in FIG. 5 that is additionally integrated therein). For brevity, similar descriptions that are described in the above-mentioned embodiments are not repeated in detail here.

Figure 8:
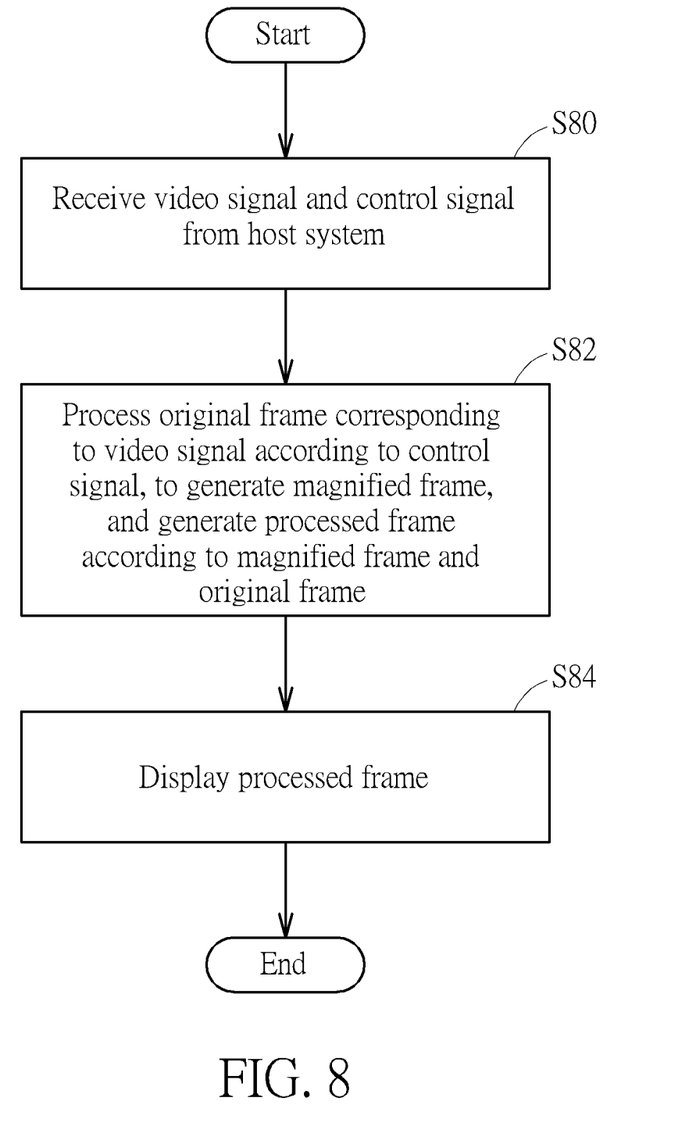
FIG. 8 is a flow chart of a control method for magnifying a display screen according to an embodiment of the present invention.

FIG. 8 is a flow chart of a control method for magnifying a display screen according to an embodiment of the present invention. Provided that the result is substantially the same, the steps are not required to be executed in the exact order shown in FIG. 8. In addition, according to some embodiments, one or more steps may be added, deleted, or changed in the flow shown in FIG. 8. The flow shown in FIG. 8 may be realized by the display system 100 shown in FIG. 1 or the display system 500 shown in FIG. 5.

Step S80: receive a video signal and a control signal from a host system.

Step S82: process an original frame corresponding to the video signal according to the control signal, to generate a magnified frame, and generate a processed frame according to the magnified frame and the original frame.

Step S84: display the processed frame.

Since a person skilled in the pertinent art can readily understand details of the steps after reading above paragraphs directed to the display systems 100/500 of the present invention, similar description in this embodiment is not repeated here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system, comprising:
a display device, arranged to receive a video signal and a control signal from a host system, comprising:

a processing circuit, arranged to process an original frame corresponding to the video signal according to the control signal, to generate a magnified frame, and generate a processed frame according to the magnified frame and the original frame; and a display screen, coupled to the processing circuit, and arranged to display the processed frame; and the host system, comprising:

a host, arranged to generate the video signal; and a control system, comprising:

an input device, arranged to receive a user input; and a control circuit, arranged to generate the control signal according to the user input;

wherein the control signal comprises a coordinate and a control instruction;

wherein the processing circuit comprises:

a storage circuit, arranged to store the original frame;

a magnification circuit, coupled to the storage circuit, and arranged to retrieve a retrieved frame that is indicated by the coordinate from the original frame according to the control instruction, and magnify the retrieved frame to generate the magnified frame; and a frame merging circuit, coupled to the storage circuit and the magnification circuit, and arranged to merge the original frame and the magnified frame, to generate the processed frame.

2. The display system of claim 1, wherein the processing circuit superposes the magnified frame on the original frame, to generate the processed frame.

3. A display system, comprising:

a display device, arranged to receive a video signal and a control signal from a host system, comprising:

a processing circuit, arranged to process an original frame corresponding to the video signal according to the control signal, to generate a magnified frame, and generate a processed frame according to the magnified frame and the original frame; and a display screen, coupled to the processing circuit, and arranged to display the processed frame; and the host system, comprising:

a host, arranged to generate the video signal; and a control system, comprising:

an input device, arranged to receive a user input and a control circuit, arranged to generate the control signal according to the user input wherein the control signal comprises a coordinate and a control instruction;

wherein the processing circuit comprises:

a storage circuit, arranged to store a retrieved frame that is indicated by the coordinate and retrieved from the original frame by the processing circuit according to the control instruction;

a magnification circuit, coupled to the storage circuit, and arranged to magnify the retrieved frame to generate the magnified frame; and a frame merging circuit, coupled to the magnification circuit, and arranged to merge the original frame and the magnified frame, to generate the processed frame.

4. A display system, comprising:

a display device, arranged to receive a video signal and a control signal from a host system, comprising:

a processing circuit, arranged to process an original frame corresponding to the video signal according to the control signal, to generate a magnified frame, and generate a processed frame according to the magnified frame and the original frame; and a display screen, coupled to the processing circuit, and arranged to display the processed frame; and the host system, comprising:

an input device, arranged to receive a user input, wherein the control signal comprises the user input;

wherein the processing circuit comprises a control circuit, and the control circuit is arranged to generate a coordinate and a control instruction according to the user input;

wherein the processing circuit further comprises:

a storage circuit, arranged to store the original frame;

a magnification circuit, coupled to the storage circuit, and arranged to retrieve a retrieved frame that is indicated by the coordinate from the original frame according to the control instruction, and magnify the retrieved frame to generate the magnified frame; and a frame merging circuit, coupled to the storage circuit and the magnification circuit, and arranged to merge the original frame and the magnified frame, to generate the processed frame.

\* \* \* \* \*